Patented Mar. 7, 1933

1,900,237

UNITED STATES PATENT OFFICE

VERN S. HARSHMAN, OF DETROIT, MICHIGAN

DENTAL CEMENT AND PROCESS OF MAKING DENTAL CEMENT

No Drawing.  Application filed July 22, 1929.  Serial No. 380,263.

My invention relates to cement to be used in the profession and art of dentistry, especially for setting crowns and bridges and for filling cavities in the teeth, and to be used by the general public for emergency treatment of toothache and for filling cavities in the teeth.

The principal object of my invention is to provide a new cement of the kind described and a process of producing it, which cement combines advantages not possessed by other dental cements with certain advantages they do possess, and at the same time avoids certain defects and disadvantages of other dental cements. These advantages, disadvantages and defects will appear more in detail later in this specification.

Other objects of my invention are to provide a process for making a dental cement and to provide a dental cement with the following characteristics: A cement adaptable to all purposes in dentistry for which cements and filling materials are now used except where porcelain or glass fillings are indicated; a cement that is anti-acid, a non-conductor of heat and electricity, analgesic, germicidal, non-irritant, not escharotic, and locally sedative and obtundent; a cement which carries medicinal agents over an extended period of time; a cement which can be applied easily without pressure, which in hardening does not rise in temperature to a point irritating to the tooth pulp or other bodily tissues, which does not change appreciably in volume, which preserves the tooth, which is resistant to attrition, which adheres and conforms to dental cavities and surfaces to which it is applied, which will in cases of emergency so adhere and conform when such cavities are damp or imperfectly dried, which is semi-resilient and not brittle, and which sets in a controllable time.

Another and one of the most important objects of my invention is to provide such a process and dental cement as will be adapted for use in emergencies and for temporary treatment by the general public, that is, by ordinary persons not skilled in dentistry. A cement adapted for such use must be capable of being very easily measured, spatulated, handled and applied by the user. It must also be safe and of such a nature as will effectually prevent pressure in the tooth cavity.

Further objects of my invention will hereinafter appear.

For filling teeth and for setting dental crowns and bridges and for other purposes in the treatment of teeth there are used masses made by mixing two or more substances, a powder and a liquid, which when mixed harden into a solid cement. Classified according to their chemical composition there are the following kinds of such cements: 1. Zinc chloride cements; 2. Zinc sulphate cements; 3. Zinc oxide phosphate cements; 4. So-called silicate cements; 5. Zinc silicate cement; 6. Magnesium oxychloride cements; 7. Magnesium guiacol cement; 8. Magnesium eugenol cement; 9. Porcelain and glass fillings; 10. Colloidal silicic acid cement.

All of the cements mentioned except those included in classes numbered 7 and 8 above have either a temporary or semi-permanent irritating effect on dental tissue and especially on the pulp tissue, and the porcelain and glass fillings are ordinarily set with cement that possesses irritating action on tooth structure. Such irritation arises from heat generated by the cement while hardening, from acid or other irritant matter included in the materials composing the cement, from pressure on the dental tissue caused by difficulty in applying the cement, or from a combination of these causes.

Those of the cements mentioned which are peculiarly adapted for making porcelain or glass fillings or for the setting of same have no relation to the cement which is the subject of this invention. Nevertheless my new cement is indicated for use in setting all porcelain or glass fillings where transparency or translucency is not required and especially where the cavity is deep, or sensitive, or closely approaches the pulp tissue of the tooth.

There is another dental cement composed partly of glycerine and designed to be marketed in an air-tight tube and to harden on exposure to the air. I have attempted to make a cement according to the formula given in the patent specification of the cement mentioned and all the trials resulted in the failure of the cement to harden. But the cement mentioned has no relation to my cement, except as it contains eugenol and zinc oxide.

The magnesium-guiacol and magesium-eugenol cements are not widely used in the dental profession because they require great care in application, disintegrate under moisture while setting, become too brittle, tend to crush under pressure, and on spatulating require the handling of a tenuous fluid difficult to confine or handle on a spatulating slab.

As distinguished from other cements my new cement is a nitro-cellulose cement, comprising two components. One component is a substance comprising nitro-cellulose and methyl salicylate, ethyl salicylate, oil of wintergreen, oil of cloves, eugenol, or any combination or mixture of these liquids. The other component is a mass comprising calcium oxide, magnesium oxide, zinc oxide (all of which are preferably calcined), strontium hydroxide, barium oxide or hydroxide, or one of these, or a combination of two or more of these. When the two components are intimately mixed or spatulated together they harden into a solid cement, without appreciable heat and with greater or less rapidity according to variations in the compositions of the components.

The first component can be made of various consistencies, either thick or thin, or more or less viscuous, by using nitro-cellulose of greater or less viscosity. This viscosity is commonly indicated by what is termed nitro-cellulose of one-half second, two second, forty second, etc., viscosity. This variation in the viscosity of the first component can be effected with any of the liquids mentioned, and with others of a similar nature, although the viscosities within the limits of thirty and eighty seconds are best adapted for general dental purposes. The nitro-celluose may be used dry, or as dampened for shipping commercially. It is usually so dampened with 49 pounds of what is known as specially denatured 2B ethyl alcohol, to 115 pounds of nitro-cellulose. It can also be used when dampened with ethyl alcohol. But the presence of the alcohol is not essential to the formation of the cement. The alcohol merely facilitates the safe handling of the nitro-cellulose.

The formation of the first component of the cement may be effected by immersing the nitro-cellulose in the liquid used, whether it be any one of those named or a combination of two or more of them. No one liquid or any combinations of those named with which I have experimented will dissolve the nitro-cellulose in the sense that it is converted into a liquid, or in the sense that more of the solvent can be homogeneously incorporated with the mass formed by the intro-cellulose and the liquid. The nitro-cellulose becomes and remains jelly-like after it has combined with or absorbed the liquid, and remains in that form indefinitely even when remaining immersed in the liquid. To convert the jelly-like mass into a liquid it is necessary to add a diluent, but this is not desirable for reasons which will later appear. The same result may be effected by pouring the liquid on the nitro-cellulose until it becomes transparent or translucent.

The higher the viscosity of the nitro-cellulose the greater is the density or viscosity of the said first component of my new cement. Nitro-cellulose of a viscosity from forty seconds to sixty seconds is preferable for a cement for general dental use, such as for setting crowns or bridges, for most temporary fillings, and for applications under metal and silicate fillings. Nitro-cellulose of a higher viscosity may be used in special cases where a cement of great strength is required, such as in fillings especially subject to attrition in occlusal or marginal cavities. Lower viscosity nitro-cellulose may be used where a very thin layer of cement is indicated, such as in fillings beneath gold inlays, or where a very narrow opening or fissure must be filled, such as a root canal.

To this first component may be added any medicinal agent soluble in or miscible with the liquid used. For instance chloratone may be used to increase the analgesic properties of the cement, and any germicide not incompatible with the liquid may be incorporated with the first component. But alcohol cannot be used in any substantial amount in excess of the percentage hereinbefore mentioned.

Wherever mentioned in this specification or in the claims following, ethyl salicylate, methyl salicylate, natural oil of wintergreen and oil of cloves or any combinations of them may be used indiscriminately. They are the preferred liquids for such use, because of their peculiar suitability for use in the mouth. The salicylates produce the whiter cement and an added oil of cloves content acts as a powerful yet harmless and non-irritant germicide and analgesic.

The second component of the cement may be calcium oxide, strontium hydroxide, barium hydroxide or oxide, magnesium oxide, zinc oxide, or any other oxide which can be dehydrated and which is fitted for use in contact with the oral tissues. The second component may also be magnesium oxychloride. Also the substances just mentioned may be used in almost any combination to form the second component of the cement. The oxides are better adapted for use in cements when calcined. All of the constituents of the second component should be powdered, preferably very finely powdered, and the entire second component is a powdered mass or a cement powder.

The zinc oxide when used alone as the second component produces a slow setting cement, which can be worked for two or three hours after mixing. The strontium hydroxide, the calcium, barium and magnesium oxides, and the magnesium oxychloride, when used as the second component produce a cement which sets in from three to five minutes. The zinc oxide may be used in the second component as a catalytic stabilizing agent to slow the setting of the cement, and it also acts to increase the feeling of smoothness to the oral tissues. Zinc oxide in sufficient quantity to constitute twenty per cent of the second component will slow the time of setting to fifteen or twenty minutes, and a greater quantity will slow the action still more. Therefore the time of the setting of the cement is controllable within wide limits.

The cement is prepared for use by intimately mixing portions of the two components. The operator should take on the spatula a piece of the first component large enough in his judgement for the purpose for which it is to be used. After spreading this on the spatulating slab he should place on top of it about an equal volume of the second component. These portions need not be accurately measured; they may be roughly estimated. After the operator has very thoroughly spatulated together the two portions he will find that they form a putty-like mass, which can be very easily applied for the intended purpose.

Since the consistency of the cement when freshly mixed is puttylike, it can be applied for the purpose of filling a cavity temporarily and for allaying pain in the tooth by any ordinary person. It can be rolled into a small ball and placed in the cavity with the tip of the finger, pressed to conformation with the cavity by occlusion of the teeth, and smoothed and the excess removed with the tip of the tongue and the action of the cheek. It will adhere even if the cavity be damp or imperfectly dried or cleaned, and during the life of the filling it will continue to act as a germicide and analgesic. Furthermore, it has the peculiar characteristic of hardening from the center outward. Therefore, when it is pressed into the cavity with the finger or otherwise, and shaped to the cavity by the pressure of occluding teeth, and smoothed by the tongue and by the action of the cheek, there is no harmful pressure transmitted to the tooth structure by the filling; and there is no irritation of the oral tissues by any excess cement remaining between the teeth or in contact with the gums.

Calcium oxide, strontium hydroxide, or magnesium oxide, used as the second component in conjunction with either of the salicylates mentioned or oil of wintergreen as a solvent in the first component, produce a white cement of great strength and of fine working qualities, which sets in from three to five minutes. In this combination can be incorporated without impairment of these characteristics a sufficient quantity of oil of cloves to give powerful germicidal action. One fifth of the liquid solvent used in the first component may be oil of cloves. Oil of cloves, if used to excess tends to impart a yellow discoloration to the cement. This effect is even more marked when eugenol is used. Twenty five per cent of the oil of cloves or fifteen per cent of the eugenol in the solvent impart a slight yellow tinge when the cement sets.

The essential constituents of my cement are the two components as described, the first being a mass comprising dissolved nitro-cellulose, and the second being a powdered mass comprising a cementitious powder constituted as above described. But various non-essential though desirable ingredients may be incorporated in either or both of the components. Such ingredients are germicides; local sedatives and anæsthetics; obtundents; substances opaque to high frequency waves; and coloring materials. Including some of these ingredients in the first component has already been mentioned. The second component may comprise various compounds of mercury, such as mercuric salicylate, mercuric and mercurous oxides, as germicides; red copper oxide as a germicide and coloring material; di-thymol di-iodide as a germicide; any aniline or azo dye soluble in the essential oils as a coloring material; and various compounds of barium to impart radiopacity. Whenever the addition of such ingredients is found to slow the setting of the cement, the amount of zinc oxide in the second component may be correspondingly reduced to offset this effect.

Moreover, one of the principal objects of my invention is effected by the form of the first component. The fact that this is not a liquid, but a jelly-like mass, differentiates it from all other cements. No liquid need be confined, handled or measured in using it. When my cement is freshly mixed it is a plastic but not a semi-liquid mass, and this, as before mentioned, makes practical its safe application by inexperienced persons.

The safety of the application of this cement by inexperienced operators is enhanced by the fact that it is not irritant even when in contact with sensitive tissue over long periods of time. During the entire life of the filling the cement slowly transmits its analgesic and germicidal action to the tissues with which it is in contact, and if that contact is with continuously moistened tissue the cement at the points of such contact loses its solid surface structure and becomes glairy or slippery.

This cement as described herein accomplishes all the objects of this invention as hereinbefore set forth.

Although the exact chemical reactions between nitro-cellulose and its solvents have not been determined, certain of such solvents are assumed in this specification and in the following claims to be chemical equivalents. Such are methyl salicylate, oil of wintergreen, and oil of birch. These are all esters and apparently act identically as solvents of nitro-cellulose; and the solutions so formed act in the same manner toward the cementitious powders. They are also the best of the solutions. Ethyl salicylate and nitro-cellulose have a distinct reaction toward the second component. Solutions made of oil of cloves and eugenol have also individual reactions toward the second component, although seemingly the reactions should be identical.

In this specification and the following claims "dissolved nitro-cellulose" and "solution of nitro-cellulose" include in their meaning the jelly-like masses herein referred to, although these masses, as already pointed out, have not all the characteristics of ordinary solutions.

The following are exemplary formulæ for the making of the cement described:

First formula

*First component.*—Solution of nitro-cellulose of 40 sec. viscosity in liquid consisting of methyl salicylate 90% by volume and oil of cassia 10% by volume.

*Second component.*—Powdered strontium hydroxide 75% by weight and zinc oxide 25% by weight (powdered). (The oil of cassia is used as a germicide and analgesic.)

Second formula

*First component.*—Solution of nitro-cellulose of 40 sec. viscosity in liquid consisting of methyl salicylate 65% by volume and oil of cloves 25% by volume and oil of cassia 10% by volume.

*Second component.*—Powdered calcium oxide 70% by weight and powdered zinc oxide 15% by weight and powdered barium sulphate 15% by weight.

Third formula

*First component.*—Solution of nitro-cellulose of 40 sec. viscosity in liquid consisting of methyl salicylate 55% by volume and ethyl salicylate 20% by volume and oil of cloves 20% by volume and oil of cassia 5% by volume.

*Second component.*—Powdered magnesium oxide 75% by weight and powdered zinc oxide 15% by weight and powdered barium sulphate 10% by weight.

Oil of cassia is used in the above formulæ as one of the added but not essential germicides and analgesics that may be used. Barium sulphate is another ingredient added only to give radiopacity.

Having thus described my invention, what I claim is:

1. A dental cement comprising a powdered and a fluid constituent adapted when mixed to harden quickly into a composition useful for a permanent tooth filling, said powdered constituent comprising a metallic oxide and said fluid constituent comprising nitrocellulose and a liquid of the group consisting of essential oils and salicylates, said liquid being capable of setting said metallic oxide, and being also a solvent of nitrocellulose.

2. A dental cement comprising a powdered and a fluid constituent adapted when mixed to harden quickly into a composition useful for a permanent tooth filling, said powdered constituent comprising a metallic oxide and said fluid constituent comprising a liquid capable of setting said metallic oxide and nitrocellulose dissolved in said liquid.

3. A dental cement comprising a powdered and a fluid constituent adapted when mixed to harden quickly into a composition useful for a permanent tooth filling, said powdered constituent comprising a metallic oxide and said fluid constituent being a jelly-like mass comprising nitrocellulose and a dental setting liquid capable of setting said metallic oxide.

4. A dental cement comprising a powdered and a fluid constituent adapted when mixed to harden quickly into a composition useful for a permanent tooth filling, said powdered constituent comprising a metallic oxide and said fluid constituent comprising nitrocellulose and an essential oil having a setting reaction with said metallic oxide and having a solvent action on nitrocellulose.

5. A dental cement comprising a powdered and a fluid constituent adapted when mixed to harden quickly into a composition useful for a permanent tooth filling, said powdered constituent comprising a metallic oxide and said fluid constituent comprising nitrocellulose and an essential oil suitable for use in the mouth, said oil having a solvent action on nitrocellulose and having setting reaction on said metallic oxide.

6. A dental cement comprising a powdered and a fluid constituent adapted when mixed to harden quickly into a composition useful for a permanent tooth filling, said powdered constituent comprising a metallic oxide and said fluid constituent comprising nitrocellulose and an ester having solvent action on nitrocellulose and having a setting reaction on said oxide.

7. A dental cement comprising a powdered and a fluid constituent adapted when mixed to harden quickly into a composition useful for a permanent tooth filling, said powdered constituent comprising a metallic oxide and said fluid constituent comprising a solution of nitrocellulose in methyl salicylate.

8. A dental cement comprising a powdered and a fluid constituent adapted when mixed to harden quickly into a composition useful for a permanent tooth filling, said powdered constituent comprising magnesium oxide and said fluid constituent comprising a solution of nitrocellulose in methyl salicylate.

9. A dental cement comprising a powdered and a fluid constituent adapted when mixed to harden quickly into a composition useful for a permanent tooth filling, said powdered constituent comprising a metallic oxide and said fluid constituent comprising a cellulose ester and a liquid having a setting action with said metal oxide and being a solvent of said cellulose ester.

10. A dental cement comprising a powdered and a fluid constituent adapted when mixed to harden quickly into a composition useful for a permanent tooth filling, said powdered constituent comprising a mixture of an oxide of an alkaline earth metal and zinc oxide, and said fluid constituent comprising a cellulose ester and a liquid solvent for said cellulose ester, said liquid having a setting re-action with said powdered constituent.

11. A dental cement comprising a powdered and a fluid constituent adapted when mixed to harden quickly into a composition useful for a permanent tooth filling, said powdered constituent comprising a mixture of an oxide of an alkaline earth metal and zinc oxide, said fluid constituent comprising a cellulose ester and a liquid salicylate having a setting re-action with said powdered constituent.

12. A dental cement comprising a powdered and a fluid constituent adapted when mixed to harden quickly into a composition useful for a permanent tooth filling, said powdered constituent comprising a preponderance of an alkaline earth oxide together with a smaller amount of zinc oxide and said fluid constituent comprising nitrocellulose, methyl salicylate, and oil of cassia.

In testimony whereof, I affix my signature.

VERN S. HARSHMAN.